United States Patent
Chenglei et al.

(10) Patent No.: US 10,109,113 B2
(45) Date of Patent: Oct. 23, 2018

(54) PATTERN AND METHOD OF VIRTUAL REALITY SYSTEM BASED ON MOBILE DEVICES

(71) Applicant: SHANDONG UNIVERSITY, Shandong (CN)

(72) Inventors: Yang Chenglei, Shandong (CN); Gai Wei, Shandong (CN); Wang Lu, Shandong (CN); Meng Xiangxu, Shandong (CN); Dong Mingda, Shandong (CN); Qin Pu, Shandong (CN); Sun Xiaowen, Shandong (CN); Liu Juan, Shandong (CN); Zhou Nianmei, Shandong (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 15/251,252

(22) Filed: Aug. 30, 2016

(65) Prior Publication Data

US 2017/0116788 A1      Apr. 27, 2017

(30) Foreign Application Priority Data

Oct. 22, 2015   (CN) .......................... 2015 1 0690423

(51) Int. Cl.
*G06T 19/20*   (2011.01)
*G06T 19/00*   (2011.01)
(Continued)

(52) U.S. Cl.
CPC ............ *G06T 19/20* (2013.01); *A63F 13/211* (2014.09); *A63F 13/212* (2014.09);
(Continued)

(58) Field of Classification Search
CPC .................. G06T 19/006; A63F 13/63; G06K 9/00442–9/00483
See application file for complete search history.

(56) References Cited

U.S. PATENT DOCUMENTS

| | | | |
|---|---|---|---|
| 2009/0102835 A1* | 4/2009 | Mikhailov | G06T 7/12 345/419 |
| 2011/0165939 A1* | 7/2011 | Borst | A63F 13/69 463/29 |
| 2013/0343609 A1* | 12/2013 | Wilson | G06K 9/00463 382/103 |

OTHER PUBLICATIONS

Video Titled "[VR] Dreadhalls with the Oculus Rift! (Maze Horror Game in Virtual Reality)", published Dec. 2, 2013, available at: https://www.youtube.com/watch?v=I2QK3ibLoRs; with select screenshots.*

* cited by examiner

*Primary Examiner* — Daniel Hajnik
(74) *Attorney, Agent, or Firm* — Oliff PLC (57) ABSTRACT

A new pattern and method of a virtual reality system based on mobile devices, which may allow a player to design a virtual scene structure in a physical space and allow quick generation of corresponding 3D virtual scenes by a mobile phone; real rotation of the head of the player is captured by an acceleration sensor in the mobile phone by means of a head-mounted virtual reality device to provide the player with immersive experience; and real postures of the player are tracked and identified by a motion sensing device to realize player's mobile input control on and natural interaction with the virtual scenes. The system only needs a certain physical space and simple virtual reality device to realize the immersive experience of a user, and provides both a single-player mode and a multi-player mode, wherein the multi-player mode includes a collaborative mode and a versus mode.

13 Claims, 6 Drawing Sheets

(51) Int. Cl.
*A63F 13/211* (2014.01)
*G06F 3/01* (2006.01)
*H04N 13/351* (2018.01)
*A63F 13/25* (2014.01)
*G06F 3/041* (2006.01)
*A63F 13/655* (2014.01)
*A63F 13/213* (2014.01)
*A63F 13/5255* (2014.01)
*A63F 13/63* (2014.01)
*A63F 13/212* (2014.01)
*H04N 13/344* (2018.01)
*H04N 13/366* (2018.01)
*H04N 13/02* (2006.01)
*H04N 13/04* (2006.01)

(52) U.S. Cl.
CPC ............ *A63F 13/213* (2014.09); *A63F 13/25* (2014.09); *A63F 13/5255* (2014.09); *A63F 13/63* (2014.09); *A63F 13/655* (2014.09); *G06F 3/012* (2013.01); *G06F 3/017* (2013.01); *G06F 3/0418* (2013.01); *G06T 19/003* (2013.01); *G06T 19/006* (2013.01); *H04N 13/351* (2018.05); *G06T 2219/024* (2013.01); *G06T 2219/2016* (2013.01); *G06T 2219/2021* (2013.01); *H04N 13/0278* (2013.01); *H04N 13/044* (2013.01); *H04N 13/0468* (2013.01); *H04N 13/344* (2018.05); *H04N 13/366* (2018.05)

PATTERN AND METHOD OF VIRTUAL REALITY SYSTEM BASED ON MOBILE DEVICES

FIELD OF THE INVENTION

The present invention relates to a new pattern and method of a virtual reality system based on mobile devices.

BACKGROUND OF THE INVENTION

Virtual reality refers to a computer technology that can provide immersive experience and can imitate the world around us. By means of three-dimensional display, users can be completely immersed in a virtual world created by a computer. On the Electronic Entertainment Expo in 2012, Oculus Company exhibited a head-mounted display Oculus Rift based on the virtual reality technology. It tracks the motion of the head by a motion sensor mounted on a helmet, and adjusts the display viewing angle to bring vivid immersive experience to the users. With the emergence of the Oculus Rift, the virtual reality technology has attracted widespread attention in the industry, the helmet mounted virtual reality device (Helmet Mounted Display, HMD) got a rapid development, such as Facebook Oculus Rift, HTC Vive, Google Cardboard and Samsung Gear VR. The HMD device, represented by Oculus Rift, is an independent product, with a variety of built-in electronic parts and components, has its own display screen, but cannot work independently of a host system; besides, the requirements on the configurations of the host are relatively high, especially on a graphic card, which should be at least NVIDIA GTX970 or AMD R9 290 grade or higher. The very high device price and the very high requirements on the computer cause the emergence of the Google Cardboard. Compared to such HMD devices, Google Cardboard provides a cheaper HMD solution for consumers, i.e., a device that is connectable to a smart phone, has a relatively simple structure and may convert 2D display into 3D virtual reality display, but with relatively bad VR experience. With reference to the basic principle of the Google Cardboard, more and more similar VR glasses emerge in the market, which mainly differ in wearing comfort, optical quality and adjustment function. For example, Samsung Gear VR is provided with a built-in tracking sensor, advanced 3D lenses, and a plastic shell, and may provide better VR experience than Google Cardboard.

At present, most of the HMD devices still use traditional interactive modes, such as using a mouse or joystick, thereby seriously affecting the immersive experience of the users. Moreover, the very fast speed of a keyboard or a joystick will cause increased dizziness, which is not conducive to the user's experience. An innovative technology company in the United States launched a new entertainment facility "The VOID (The Vision of Infinite Dimensions)" in which players wear virtual reality devices to enter a virtual world, and in collaboration with a real scene set up with the theme of the virtual scenes, the players can move freely therein to experience the fun of the virtual reality. However, similar to most VR games, such virtual reality scenes are fixed and designed in advance, and the user almost never participates in the design of the virtual scenes. Moreover, the experience similar to VOID requires the support of related real scenes, and the construction of the related real environment is a complex process, thereby being time-consuming and high in cost.

At present, the problems of virtual reality games are mainly reflected in that: the virtual scenes are fixed and designed in advance; the user almost never participates in the design of the virtual scenes; and the collaborative design and games between users are less involved.

SUMMARY OF THE INVENTION

In order to solve the above problems, the present invention provides a new pattern and method of a virtual reality system based on mobile devices. The present invention allows a player to design a virtual scene structure in a physical space and permit quick generation of corresponding 3D virtual scenes by a mobile phone; real rotation of the head of the player is captured by an acceleration sensor in the mobile phone by means of a head-mounted virtual reality device to provide the player with immersive experience; and real postures of the player are tracked and identified by a motion sensing device to realize player's mobile input control on and natural interaction with the virtual scenes. The system only needs a certain physical space and simple virtual reality device to realize the immersive experience of a user.

To achieve the above objective, the present invention employs the following technical solutions:

A new pattern (or system) of a virtual reality system based on mobile devices comprises a design pattern and a game pattern, wherein the design pattern involves a scene design module, a correction module and a modeling module; the game pattern involves a stereoscopic display module, a tracking module, a first interactive module and a second interactive module.

The scene design module is configured to design corresponding scenes in a real space according to game types.

The correction module is configured to photograph the scene structure in the real space to obtain a plan view of the designed scene structure, and perform image correction on the plan view to obtain a standard plan view.

The modeling module is configured to obtain features of the scene structure as modeling information of three-dimensional scenes and send the features to clients of players to complete building of virtual scenes.

The stereoscopic display module is configured to display images corresponding to left and right eyes on split screens of the client of each player, respectively, project the images into the eyes by means of convex lenses, make what the player sees stereoscopic by means of head-mounted virtual reality glasses, capture the head rotation of the player, accomplish tracking on the field of view and the point of view of the player, determine objects in the current field of view as well as the location and orientation of the point of view of the player.

The tracking module is configured to map the location information of the player captured by a motion sensing device into the virtual scenes and provide data of the location and actions of the corresponding player in the virtual scenes.

The first interactive module is configured to realize interaction of the player with virtual objects, determine and interpret instructions issued by the virtual objects, provide corresponding feedback results, and present the scenes of a virtual world to the player via the virtual reality glasses.

The second interactive module is configured to realize interaction among players to complete respective tasks in the virtual scenes.

The new pattern of the virtual reality system can be applied to a plurality of game systems, in particular all virtual reality games such as maze game, shooting, tracking, ball sports, virtual boxing, room escape, driving and the like, in which the virtual reality devices are used to display the virtual scenes, while the motion sensing devices are used to capture human actions and provide human-computer interaction and human-human interaction (collaboration or versus) modes.

Now detailed descriptions are made with the example of the maze game. However, the transformations and applications of the new pattern of the virtual reality system provided by the present invention to other game systems without creative work should all fall into the protection scope of the present invention.

A virtual reality maze game system based on mobile devices comprises two working patterns, i.e., a design pattern and a game pattern, wherein the design pattern involves a scene design module, a correction module and a modeling module; the game pattern involves a stereoscopic display module, a tracking module, a first interactive module and a second interactive module.

The scene design module is configured to draw a planar graph of a maze in a real space by means of contour lines with drawing tools to create maze scenes.

The correction module is configured to photograph the maze in the real space to obtain a plan view of the maze structure, and perform image correction on the plan view to obtain a standard plan view.

The modeling module is configured to obtain structure features of the corrected maze, send the structure information, for example, locations of walls, of the maze as modeling information of three-dimensional scenes to players to complete parsing and building of virtual scenes.

The stereoscopic display module is configured to display images corresponding to left and right eyes on split screens of the client of each player, respectively, project the images into the eyes by means of convex lenses, make what the player sees stereoscopic by means of head-mounted virtual reality glasses, capture the head rotation of the player, accomplish tracking on the field of view and the point of view of the player, determine objects in the current field of view as well as the location and orientation of the point of view of the player, and provide the player with immersed experience.

The tracking module is configured to track the field of view and the point of view of a user to determine objects and location and orientation of the point of view of the user in the current field of view.

The first interactive module is configured to realize interaction of the player with virtual objects, determine and interpret instructions issued by the virtual objects, provide corresponding feedback results, and present the scenes of a virtual world to the player via the virtual reality glasses.

The second interactive module is configured to realize interaction among players to complete respective tasks in the virtual scenes.

The second interactive module specifically comprises a collaborative module and a versus module, wherein the collaborative module realizes collaboration among players and allows the players to accomplish tasks in the virtual scenes together;

the versus module allows versus experience for the players: the first-type players (referred to as type A players) perform roaming and interactions in the virtual scenes by means of the virtual reality glasses and posture recognition, while the second-type players (referred to as type B players) watch the statuses of the type A players on mobile phones, and make virtual objects or persons for the type A players in real time with operations on touch screens to interfere with the task accomplishments of the type A players.

A working method of a system based on a collaborative mode includes the following steps:

(1) designing a planar maze graph in a real space by a drawing tool, photographing the planar maze graph, correcting picture distortion caused by a perspective reason during photograph, and obtaining structural information of the maze;

(2) judging whether a plurality of players participate in different places by the system according to the participation states of the players, if so, skipping to a step (3), and otherwise, skipping to a step (4);

(3) drawing, by the players, mazes with the same shape and size on their respective real scenes according to the structural information of the maze sent by a server side;

(4) generating automatically three-dimensional virtual scenes by clients of the players according to the structural information of the maze from the modeling module;

(5) mapping the captured location information and action information of the players into the virtual scenes by the tracking model, to provide data for the locations and the actions of the players in the virtual scenes;

(6) obtaining a rotation angle of the head of the player by a sensor-based registration method to determine the location and orientation of the view point of the user, rendering the scene in combination with the location and the action data obtained by the tracking module, displaying the scene in the virtual world to the user by using virtual reality glasses as an output device, and accomplishing the roaming and interaction of the player in the virtual scenes;

(7) judging whether the game is over, and if so, terminating; and otherwise, skipping to the step (5).

In the step (1), the specific method of building the virtual maze includes:

(1-1) designing the planar maze graph in the real space by the drawing tool, and photographing the planar maze graph by a camera built in the mobile phone;

(1-2) correcting the obtained pictures, manually marking four angular points on an outer frame of the maze in the photographed picture, and automatically performing, by the system, keystone correction of the picture according to a perspective distortion correction algorithm; and (1-3) obtaining the feature information of the maze, and manually marking and storing the feature information of the maze in the corrected pictures.

In the step (5), the specific steps of tracking by the Kinect include:

(5-1) correcting coordinates, selecting multiple groups of sample points with different locations in the real space such that the sample points are distributed uniformly, and measuring the location of each sample point in the virtual scenes and the location in the Kinect coordinate system;

(5-2) calculating a transformation matrix T of the Kinect for a virtual scene coordinate system by using the least square method; and (5-3) calculating the user location and recognizing action by capturing the location information of a hand joint point and the head of the user.

In the step (5-3), the specific method of calculating the user location is as follows: setting the obtained location information of the user by the $k^{th}$ frame of Kinect as $P_i(k)=\{x_i^k, y_i^k, z_i^k\}$, wherein i represents the number of persons capable of being tracked by the Kinect, $0 \leq i \leq 6$; and then using the location $VP_i(k)=P_i(k)*T$ of the player in the virtual reality to control the movement of a virtual hero.

In the step (5-3), the specific method of recognizing the action is as follows: judging the action of the user through the location information of the hand joint point and the head of the user captured by the Kinect: $(X_{LH}, Y_{LH}, Z_{LH})$, $(X_{RH}, Y_{RH}, Z_{RH})$ and $(X_H, Y_H, Z_H)$ respectively representing the spatial locations of a left hand, a right hand and the head of the user;

defining an action symbol: $\Delta Y_1 = Y_{LH} - Y_H$, $\Delta Y_2 = Y_{RH} - Y_H$, if $\Delta Y_1 > 0$ or $\Delta Y_2 > 0$, which indicates that the user lifts a hand, then controlling the interaction between the user and the object in the virtual scenes by the action symbol.

In the step (6), the mobile phone is placed in the virtual reality glasses, the glasses is worn, and the location of the glasses is adjusted, so that the scene seen by the user is consistent with that in the reality; and the view angle of the user in the virtual system is adjusted by rotating the head by means of a gyroscope or a gravity sensor built in the mobile phone, in order to track the view field and the view point of the user.

A working method of a system based on a versus mode includes the following steps:

(1) designing a planar maze graph in a real space by a player via a drawing tool, photographing the planar maze graph, correcting picture distortion caused by a perspective reason during photograph, and obtaining structural information of the maze;

(2) generating automatically three-dimensional virtual scenes by a client of the player according to the structural information of the maze from the modeling module;

(3) judging the type of the player according to the participation mode of the player by the system, and if the player is a player of type A, skipping to a step (4); and if the player is a player of type B, skipping to a step (5)

(4) mapping the captured location information and action information of the player of type A into the virtual scenes by the tracking model, to provide data for the location and the action of the player in the virtual scenes; obtaining a rotation angle of the head of the player of type A by a sensor-based registration method to determine the location and orientation of the view point of the player of type A, rendering the scene in combination with the location and the action data obtained by the tracking module, displaying the scene in the virtual world to the user by using virtual reality glasses as an output device, accomplishing the roaming and interaction of the player in the virtual scenes, and skipping to a step (6);

(5) checking the state of the player of type A in the virtual scenes by the player of type B via the mobile phone, and adding a virtual object or person in the virtual scenes by a touch screen in real time to interfere with the accomplishment of the task of the player of type A; and (6) judging whether the game is over, and if so, terminating; and otherwise, skipping to the step (3).

In the step (5), the specific steps of the player of type B adding the virtual object or person in the virtual scenes by the touch screen are as follows:

(5-1) obtaining the location of a touch point on the touch screen, defining $$SP_K = \begin{pmatrix} sp_x \\ sp_y \\ 1 \end{pmatrix}$$

representing the $k^{th}$ frame touch point, $sp_x$ represents the touch point in the horizontal direction on the touch screen, $sp_y$ represents the touch point in the vertical direction on the touch screen;

(5-2) converting the location of the touch point into the location $$VP_K = \begin{pmatrix} vp_x \\ vp_y \\ vp_z \\ 1 \end{pmatrix}$$

in the virtual scene by means of a mapping matrix:

$$VP_k = H \cdot SP_k,$$

Wherein $$H = \begin{pmatrix} \frac{1}{h} & 0 & \frac{41w - 29h}{2h} \\ 0 & 0 & a \\ 0 & \frac{41}{h} & 0 \\ 0 & 0 & 1 \end{pmatrix},$$

in which $vp_x$ represents the converted location of the touch point in the x direction in the virtual space, while $vp_y$ represents the converted location of the touch point in the y direction in the virtual space, and $vp_z$ represents the converted location of the touch point in the z direction in the virtual space; w and h respectively represent the width and the height of the mobile phone screen; a represents the height of a virtual object or person to be created (i.e., the location of the virtual object or person in the y direction in the virtual space);

(5-3) generating the virtual objects or persons at $VP_k$.

The working principle of the present invention is as follows: a user draws a maze structure in a certain space with drawing tools (e.g., chalks, colored ribbons) without being restrained by other factors; then, photographing is carried out using a mobile phone to quickly create corresponding three-dimensional virtual scenes; immersive experience is allowed for a player through the real rotation of the head of the player with virtual reality glasses (e.g., Google Cardboard); and the real posture of the player is tracked and recognized by a motion sensing device (e.g., Kinect) to realize the player's mobile input control on and natural interaction with the virtual scenes. The present invention provides two experience modes: a single-player mode and a multiplayer mode. The multi-player mode includes a collaborative mode and a versus mode. A plurality of players include a plurality of players in the same place and a plurality of players in different places, the players communicate by a client server, one player draws the game scene, and all players share the same virtual game scene.

The present invention has the following beneficial effects:

(1) the present invention is focused on enhancing the player participation and achieving collaborative design by means of the imagination of the player to enable the player to play what he is thinking, so the use is convenient, the operation is easy and the cost is low;

(2) the subjectivity of the scene design in the present invention is stronger, and the planar graph only needs to be drawn on a site with less requirements on professional design knowledge, and therefore, it is suitable for general users;

(3) the users of the present invention just adopt natural interaction modes without extra training; only a simple virtual reality device is needed, and the adopted device is suitable for a family and individuals to experience, thereby realizing ubiquitous immersed game experience simply and rapidly;

(4) the present invention supports multi-player games, and allows players in different places to experience the same as those in the same place;

(5) a part from extensive applications in the aspect of game entertainment, the similar techniques can also be used in such fields as education and firefighting training. For example, in the firefighting training, different indoor planar graphs can be drawn on the ground, and three-dimensional virtual scenes are created quickly to allow firefighters to conduct fire-fighting drilling therein.

DETAILED DESCRIPTION OF THE EMBODIMENTS

The present invention will be further illustrated below in combination with the drawings and embodiments.

The embodiments are only described with the example of the maze system, and the simple alterations of the embodiments and the applications thereof in game scenes such as boxing, tracking, tennis, shooting, room escape, driving and the like should all fall into the protection scope of the present invention.

Figure 1:
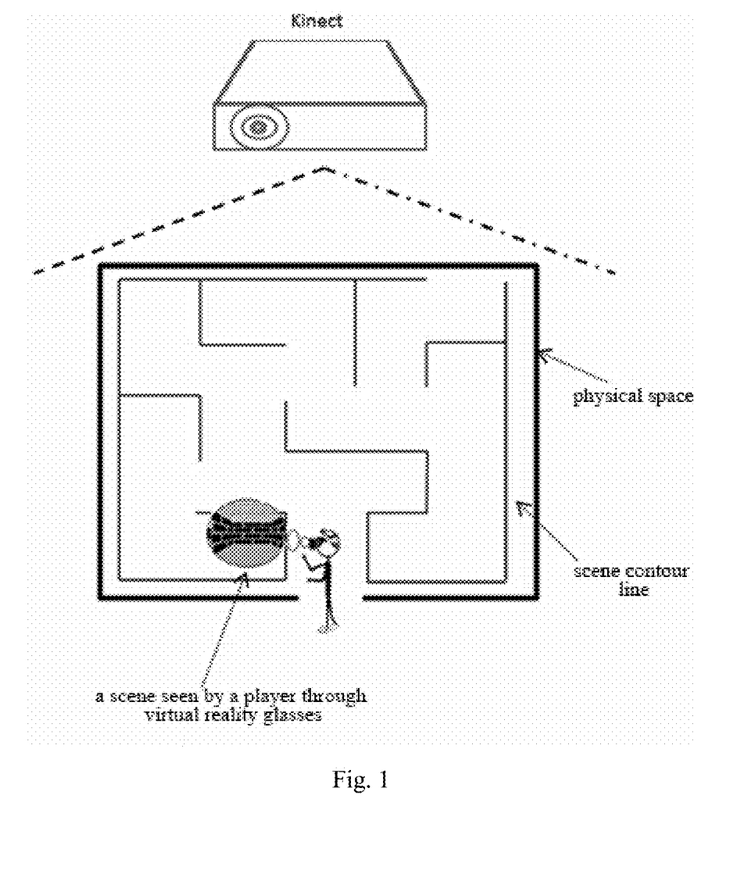
FIG. 1 is a principle schematic diagram of the present invention.

As shown in FIG. 1, a scene contour line is drawn on an empty site to represents a wall in the virtual maze, the scene contour line is photographed by the camera of a smart phone, and the three-dimensional scene is quickly established; the user wears the virtual reality glasses to truly represent the three-dimensional scene and establishes communication with the server by the smart phone, and the location information and action of the player are captured by the Kinect to accomplish the real-time interaction with the virtual scene. In addition, we optimize the Kinect and add a power supply mode of a mobile power supply to facilitate the outdoor use of the user.

Figure 2:
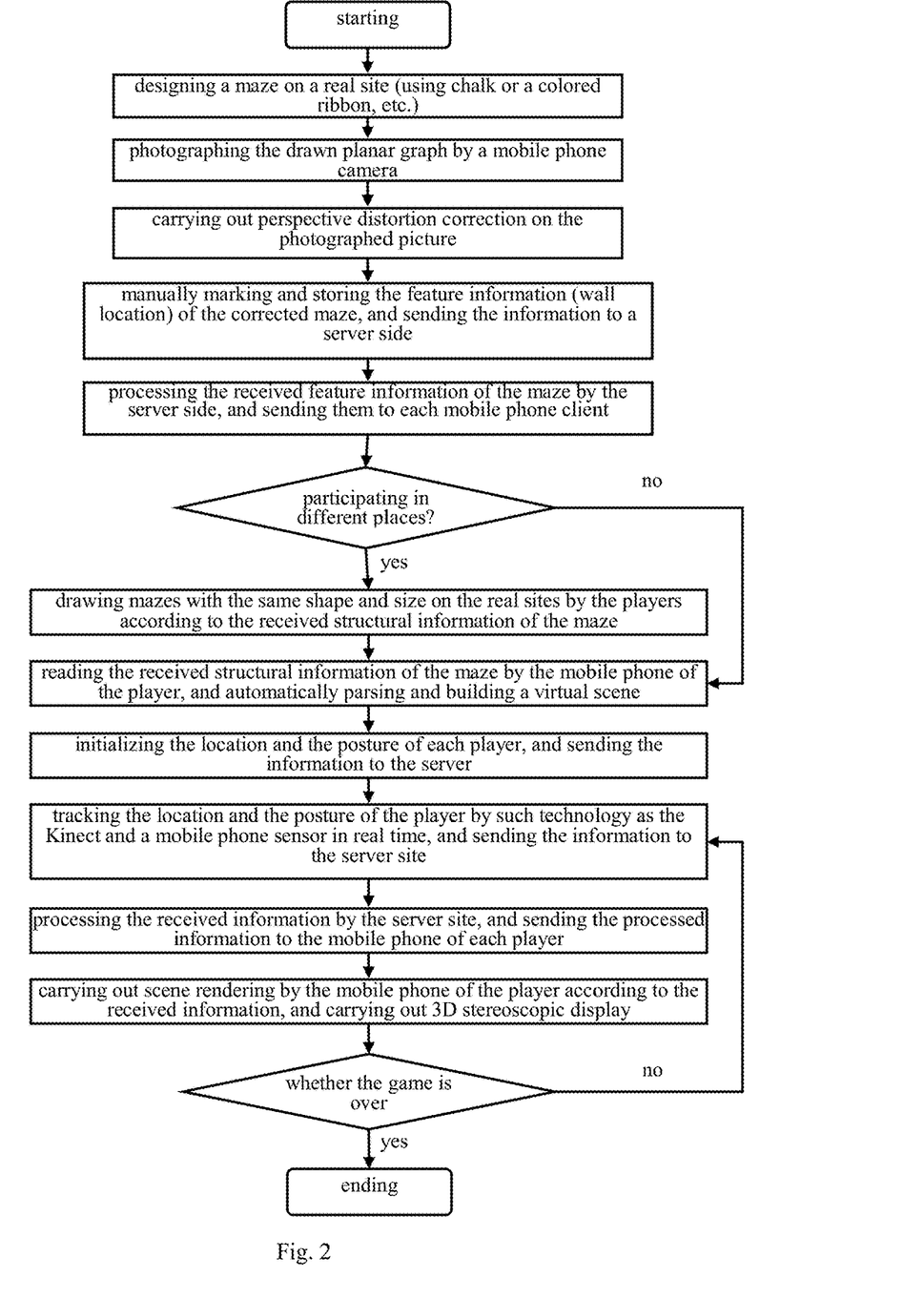
FIG. 2 is a system flowchart based on a collaborative mode of the present invention.

As shown in FIG. 2, the specific flowchart of the present invention based on the collaborative mode is as follows:

(1) designing a planar maze graph in a real space by a player via a drawing tool (chalk, a colored ribbon or the like);

(2) photographing the drawn planar graph by a mobile phone camera;

(3) carrying out perspective distortion correction on the photographed picture, manually marking four angular points on an outer frame of the maze in the photographed picture, and automatically performing, by the system, keystone correction of the picture according to a perspective distortion correction algorithm by the system;

(4) obtaining the feature information of the maze, and marking and storing the feature information (wall location) of the maze in the corrected picture, and sending the information to a server side;

(5) processing the received feature information of the maze by the server side, and sending the processed feature information of the maze to each mobile phone client;

(6) judging whether a plurality of players participate in different places by the system according to the participation states of the players, if so, skipping to a step (7), and otherwise, skipping to a step (8);

(7) drawing, by the players, mazes with the same shape and size on their respective real scenes according to the received structural information of the maze;

(8) reading the received structural information of the maze by the mobile phone of the player, and automatically parsing and establishing a virtual scene;

(9) initializing the location and the posture of each player, and sending the information to the server site;

(10) tracking the location and the posture of the player by such technology as the Kinect and a mobile phone sensor in real time, and sending the information to the server site;

(11) processing the received information by the server site, and sending the processed information to the mobile phone of each player;

(12) carrying out scene rendering by the mobile phone of the player according to the received information, and carrying out 3D stereoscopic display; and (13) judging whether the game is over, and if so, terminating; and otherwise, skipping to the step (10).

Figure 3:
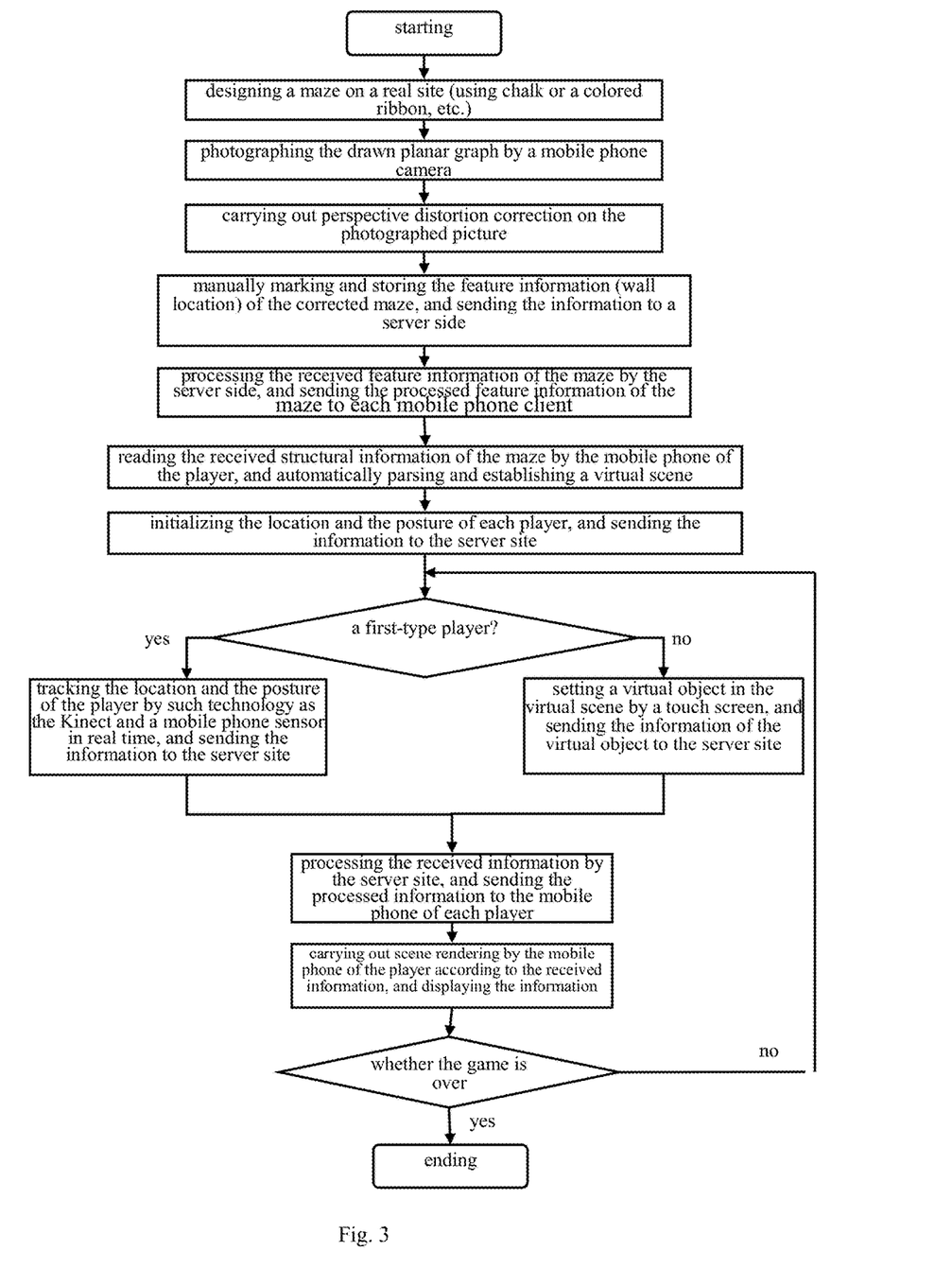
FIG. 3 is a system flowchart based on a versus mode of the present invention.

As shown in FIG. 3, the specific flowchart of the present invention based on the versus mode is as follows:

(1) designing a planar maze graph in a real space by a player via a drawing tool (chalk, a colored ribbon or the like);

(2) photographing the drawn planar graph by a mobile phone camera;

(3) carrying out perspective distortion correction on the photographed picture, manually marking four angular points on an outer frame of the maze in the photographed picture, and automatically performing, by the system, keystone correction of the picture according to a perspective distortion correction algorithm by the system;

(4) obtaining the feature information of the maze, and marking and storing the feature information (wall location) of the maze in the corrected picture, and sending the information to a server side;

(5) processing the received feature information of the maze by the server side, and sending the processed feature information of the maze to each mobile phone client;

(6) reading the received structural information of the maze by the mobile phone of the player, and automatically parsing and establishing a virtual scene;

(7) initializing the location and the posture of each player, and sending the information to the server site;

(8) judging the type of the player, if the player is a first-type player (player of type A), skipping to a step (9); and if the player is a second-type player (player of type B), skipping to a step (10);

(9) tracking the location and the posture of the player by such technology as the Kinect and a mobile phone sensor in real time, sending the information to the server site, and skipping to a step (11);

(10) setting a virtual object in the virtual scene by a touch screen, and sending the information of the virtual object to the server site;

(11) processing the received information by the server site, and sending the processed information to the mobile phone of each player;
(12) carrying out scene rendering by the mobile phone of the player according to the received information, and displaying the information; and
(13) judging whether the game is over, and if so, terminating; and otherwise, skipping to the step (8).

Figure 4A:
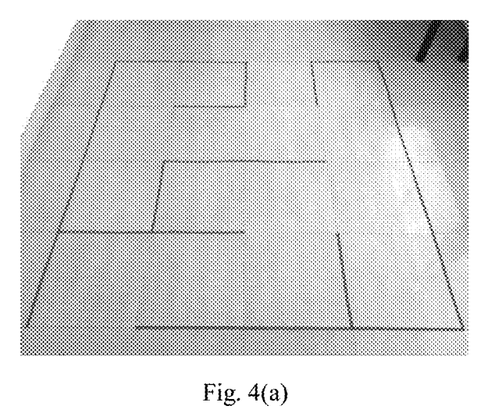
FIG. 4(a) is a planar maze graph.
Figure 4B:
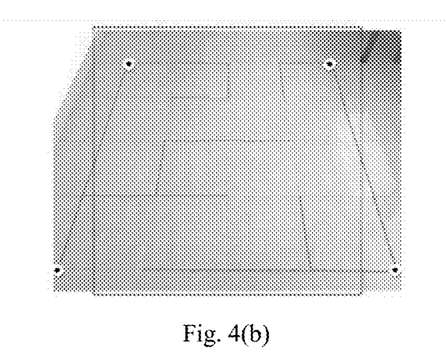
FIG. 4(b) is correction of an obtained maze picture.
Figure 4C:
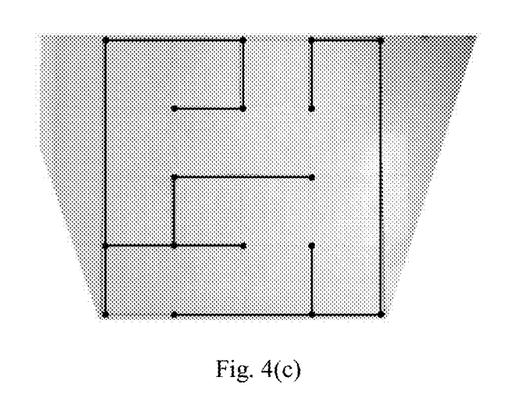
FIG. 4(c) is marking of feature information (wall location) of a maze in a corrected picture.

As shown in FIG. 4, the modeling of the virtual maze specifically includes the following steps:
(1) photographing the draw planar graph by the mobile phone camera, as shown in FIG. 4(a);
(2) when a ground picture is photographed from a low angle, distortion of the picture scene will be caused by the perspective reason, the original maze graph with a rectangular outer frame becomes trapezoidal in the photographed picture, thus being distorted, in this way, correcting the obtained picture, manually marking the four angular points on the outer frame of the maze in the photographed picture, and automatically accomplishing the keystone correction of the picture according to the perspective distortion correction algorithm by the system to recover the original shape, as shown in FIG. 4(b);
(3) obtaining the feature information of the maze, and manually marking (as shown in FIG. 4(c)) and storing the feature information (wall locations) of the maze in the corrected pictures, and sending the information to the server;
(4) processing the received information of by the server side, and sending the processed information to each mobile phone client; and
(5) reading the received information by the mobile phone of the player, automatically parsing the virtual scene, and establishing the corresponding three-dimensional virtual scene.

Images corresponding to the left and right eyes on split screens of a transverse mobile phone, respectively, and then are projected into the eyes by means of convex lenses; it may make what a person sees stereoscopic by means of head-mounted virtual reality glasses. Thereafter, the head rotation of a player is captured by means of the gyroscope built in the mobile phone, thereby accomplishing tracking on the field of view and the point of view of the player, determining objects in the current field of view as well as the location and orientation of the point of view of the player, and providing the player with immersed experience. The motion sensing device (Kinect) is employed to capture the location information of the player.

Figures 5A, 5B:
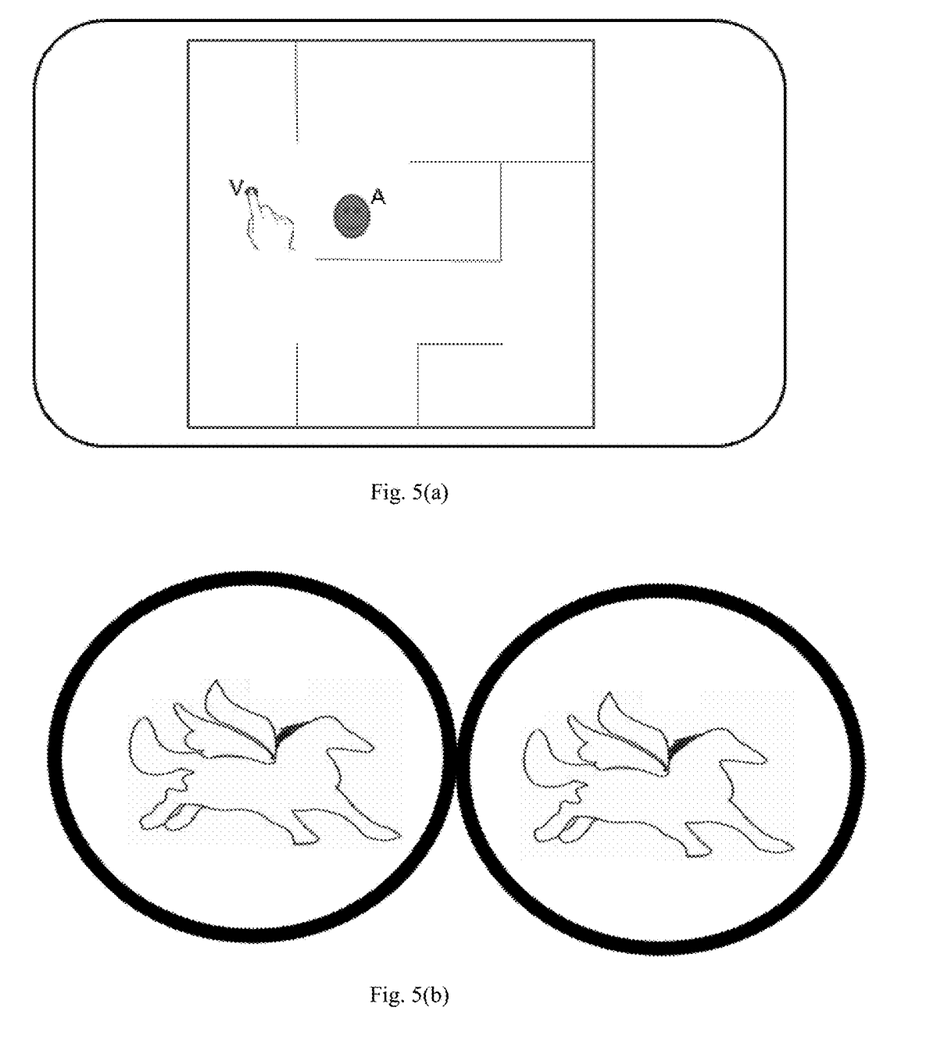
FIG. 5(a) and FIG. 5(b) are schematic diagrams of players based on the versus mode of the present invention.

As shown in FIG. 5, it is a schematic diagram of players based on the versus mode of the present invention. In FIG. 5(a), the second-type player (player of type B) views the location (as denoted by a point A in the figure) of the first-type player (player of type A) by a mobile phone screen, and sets the virtual object (as denoted by a point V in the figure) in the virtual scene by the touch screen, to increase the excitement and innovation of the experience; and FIG. 5(b) is a figure of a virtual image represented through the virtual reality glasses by the first-type player (player of type A).

Figure 6A:
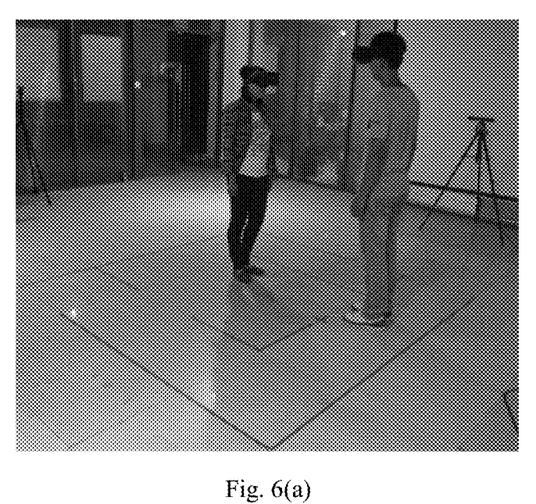
FIG. 6(a) and FIG. 6(b) are examples of the present invention applied to a maze game.
Figure 6B:
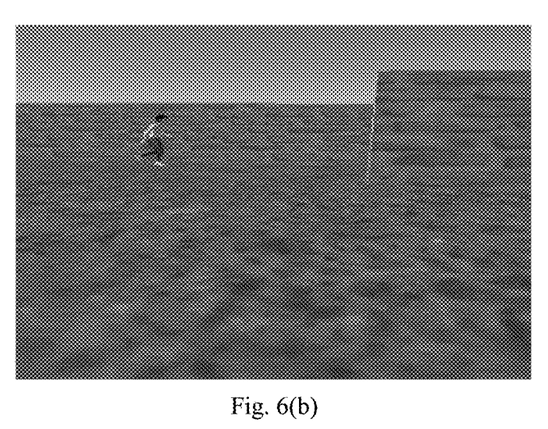

As shown in FIG. 6(a) and FIG. 6(b), it is an example of the present invention applied to a maze game. In the two-player maze game, the player A and the player B see each other in the example during movement when the distance is closer.

Although the specific embodiments of the present invention have been described above in combination with the drawings, the protection scope of the present invention is not limited hereto. It should be appreciated by those skilled in the art that various modifications or variations, made by those skilled in the art on the basis of the technical solutions of the present invention without any creative work, shall still fall within the protection scope of the present invention.

The invention claimed is:

1. A virtual reality maze game system based on mobile devices, comprising a design pattern and a game pattern, wherein the design pattern involves a scene design module, a correction module and a modeling module; the game pattern involves a stereoscopic display module, a tracking module, a first interactive module and a second interactive module;

the scene design module is configured to draw a planar graph of a maze in a real space by contour lines with drawing tools to create maze scenes;

the correction module is configured to photograph the maze in the real space to obtain a plan view of a maze structure, and perform image correction on the plan view to obtain a standard plan view;

the modeling module is configured to obtain structure features of the corrected maze, and send structure information including locations of walls of the maze as modeling information of three-dimensional scenes to players to complete parsing and building of virtual scenes;

the stereoscopic display module is configured to display images corresponding to left and right eyes on split screens of a client of each player, respectively, project the images into the eyes by convex lenses, make what the player sees stereoscopic by head-mounted virtual reality glasses, capture the head rotation of the player, accomplish tracking on the field of view and the point of view of the player, determine objects in the current field of view as well as the location and orientation of the point of view of the player, and provide the player with an immersed experience;

the tracking module is configured to track the field of view and the point of view of a user to determine objects and location and orientation of the point of view of the user in the current field of view;

the first interactive module is configured to realize interaction of the player with virtual objects, determine and interpret instructions issued by the virtual objects, provide corresponding feedback results, and present the scenes of a virtual world to the player via the virtual reality glasses;

the second interactive module is configured to realize interaction among players to complete respective tasks in the virtual scenes; and the second interactive module specifically comprises a collaborative module and a versus module, wherein the collaborative module realizes collaboration among players and allows the players to accomplish tasks in the virtual scenes together; the versus module allows versus experience for the players: the first-type players (referred to as type A players) perform roaming and interactions in the virtual scenes by the virtual reality glasses and posture recognition, while the second-type players (referred to as type B players) watch the statuses of the type A players on mobile phones, and make virtual objects or persons for the type A players in real time with operations on touch screens to interfere with the task accomplishments of the type A players.

2. A working method of a versus mode based on the virtual reality maze game system of claim 1, comprising the following steps:
  (1) designing a planar maze graph in a real space by a player via a drawing tool, photographing the planar maze graph, correcting picture distortion caused by a perspective reason during photograph, and obtaining structural information of the maze;
  (2) generating automatically three-dimensional virtual scenes by a client of the player according to the structural information of the maze from the modeling module;
  (3) judging the type of the player according to the participation mode of the player by the system, and if the player is a type A player, skipping to a step (4); and if the player is a type B player, skipping to a step (5)
  (4) mapping the captured location information and action information of the type A player into the virtual scenes by the tracking model, to provide data for the location and the action of the player in the virtual scenes; obtaining a rotation angle of the head of the type A player by a sensor-based registration method to determine the location and orientation of the view point of the type A player, rendering the scene in combination with the location and the action data obtained by the tracking module, displaying the scene in the virtual world to the user by using virtual reality glasses as an output device, accomplishing the roaming and interaction of the player in the virtual scenes, and skipping to a step (6);
  (5) checking the state of the type A player in the virtual scenes by the type B player via the mobile phone or a tablet computer, and adding a virtual object or person in the virtual scenes by a touch screen in real time to interfere with the accomplishment of the task of the type A player; and
  (6) judging whether the game is over, and if so, terminating; and otherwise, skipping to the step (3).

3. The working method of the versus mode of claim 2, specifically comprising:
  (5-1) obtaining the location of a touch point on the touch screen, defining $$SP_k = \begin{pmatrix} sp_x \\ sp_y \\ 1 \end{pmatrix}$$

representing the k-th frame touch point, $sp_x$ represents the touch point in the horizontal direction on the touch screen, $sp_y$ represents the touch point in the vertical direction on the touch screen;
  (5-2) converting the location of the touch point into the location $$VP_k = \begin{pmatrix} vp_x \\ vp_y \\ vp_z \\ 1 \end{pmatrix}$$

in the virtual scene by a mapping matrix:

$$VP_k = H \cdot SP_k,$$

Wherein $$H = \begin{pmatrix} \frac{1}{h} & 0 & \frac{41w - 29h}{2h} \\ 0 & 0 & a \\ 0 & \frac{41}{h} & 0 \\ 0 & 0 & 1 \end{pmatrix},$$

in which $vp_x$ represents the converted location of the touch point in the x direction in the virtual space, while $vp_y$ represents the converted location of the touch point in the y direction in the virtual space, and $vp_z$ represents the converted location of the touch point in the z direction in the virtual space; w and h respectively represent the width and the height of the mobile phone screen; a represents the height of a virtual object or person to be created;
  (5-3) generating the virtual objects or persons at $VP_k$.

4. A working method of a collaborative mode based on the virtual reality maze game system based on mobile devices of claim 1, comprising the following steps:
  (1) designing a planar maze graph in a real space by a drawing tool, photographing the planar maze graph, correcting picture distortion caused by a perspective reason during photograph, and obtaining structural information of the maze;
  (2) judging whether a plurality of players participate in different places by the system according to the participation states of the players, if so, skipping to a step (3), and otherwise, skipping to a step (4);
  (3) drawing, by the players, mazes with the same shape and size on their respective real scenes according to the structural information of the maze sent by a server side;
  (4) generating automatically three-dimensional virtual scenes by clients of the players according to the structural information of the maze from the modeling module;
  (5) mapping the captured location information and action information of the players into the virtual scenes by the tracking model, to provide data for the locations and the actions of the players in the virtual scenes;
  (6) obtaining a rotation angle of the head of the player by a sensor-based registration method to determine the location and orientation of the view point of the user, rendering the scene in combination with the location and the action data obtained by the tracking module, displaying the scene in the virtual world to the user by using virtual reality glasses as an output device, and accomplishing the roaming and interaction of the player in the virtual scenes;
  (7) judging whether the game is over, and if so, terminating; and otherwise, skipping to the step (5).

5. The working method of the collaborative mode of claim 4, wherein in the step (1), the specific method of building the virtual maze comprises:
  (1-1) designing the planar maze graph in the real space by the drawing tool, and photographing the planar maze graph by a camera built in the mobile phone;
  (1-2) correcting the obtained pictures, manually marking four angular points on an outer frame of the maze in the photographed picture, and automatically performing, by the system, keystone correction of the picture according to a perspective distortion correction algorithm;

(1-3) obtaining the feature information of the maze, and manually marking and storing the feature information of the maze in the corrected pictures.

6. The working method of the collaborative mode of claim 4, wherein in the step (5), the specific steps of tracking by the Kinect include:
   (5-1) correcting coordinates, selecting multiple groups of sample points with different locations in the real space such that the sample points are distributed uniformly, and measuring the location of each sample point in the virtual scenes and the location in the Kinect coordinate system;
   (5-2) calculating a transformation matrix T of the Kinect for a virtual scene coordinate system by using the least square method; and
   (5-3) calculating the user location and recognizing action by capturing the location information of a hand joint point and the head of the user.

7. The working method of the collaborative mode of claim 6, wherein in the step (5-3), the specific method of calculating the user location is as follows: setting the obtained location information of the user by the $k^{th}$ frame of Kinect as $P_i(k)=\{x_i^k, y_i^k, z_i^k\}$, wherein i represents the number of persons capable of being tracked by the Kinect, $0 \leq i \leq 6$; and then using the location $VP_i(k)=P_i(k)*T$ of the player in the virtual reality to control the movement of a virtual hero.

8. The working method of the collaborative mode of claim 6, wherein in the step (5-3), the specific method of recognizing the action is as follows: judging the action of the user through the location information of the hand joint point and the head of the user captured by the Kinect: $(X_{LH}, Y_{LH}, Z_{LH})$, $(X_{RH}, Y_{RH}, Z_{RH})$ and $(X_H, Y_H, Z_H)$ respectively representing the spatial locations of a left hand, a right hand and the head of the user;
   defining an action symbol: $\Delta Y_1 = Y_{LH} - Y_H$, $\Delta Y_2 = Y_{RH} Y_H$, if $\Delta Y_1 > 0$ or $\Delta Y_2 > 0$, which indicates that the user lifts a hand, then controlling the interaction between the user and the object in the virtual scenes by the action symbol.

9. A working method of a collaborative mode based on a virtual reality maze game system based on mobile devices, the virtual reality maze game system including a design pattern and a game pattern, wherein the design pattern involves a scene design module, a correction module and a modeling module; the game pattern involves a stereoscopic display module, a tracking module, a first interactive module and a second interactive module; the scene design module is configured to draw a planar graph of a maze in a real space by contour lines with drawing tools to create maze scenes; the correction module is configured to photograph the maze in the real space to obtain a plan view of a maze structure, and perform image correction on the plan view to obtain a standard plan view; the modeling module is configured to obtain structure features of the corrected maze, and send structure information including locations of walls of the maze as modeling information of three-dimensional scenes to players to complete parsing and building of virtual scenes; the stereoscopic display module is configured to display images corresponding to left and right eyes on split screens of a client of each player, respectively, project the images into the eyes by convex lenses, make what the player sees stereoscopic by head-mounted virtual reality glasses, capture the head rotation of the player, accomplish tracking on the field of view and the point of view of the player, determine objects in the current field of view as well as the location and orientation of the point of view of the player, and provide the player with an immersed experience; the tracking module is configured to track the field of view and the point of view of a user to determine objects and location and orientation of the point of view of the user in the current field of view; the first interactive module is configured to realize interaction of the player with virtual objects, determine and interpret instructions issued by the virtual objects, provide corresponding feedback results, and present the scenes of a virtual world to the player via the virtual reality glasses; and the second interactive module is configured to realize interaction among players to complete respective tasks in the virtual scenes,
   the working method, comprising the following steps:
   (1) designing a planar maze graph in a real space by a drawing tool, photographing the planar maze graph, correcting picture distortion caused by a perspective reason during photograph, and obtaining structural information of the maze;
   (2) judging whether a plurality of players participate in different places by the system according to the participation states of the players, if so, skipping to a step (3), and otherwise, skipping to a step (4);
   (3) drawing, by the players, mazes with the same shape and size on their respective real scenes according to the structural information of the maze sent by a server side;
   (4) generating automatically three-dimensional virtual scenes by clients of the players according to the structural information of the maze from the modeling module;
   (5) mapping the captured location information and action information of the players into the virtual scenes by the tracking model, to provide data for the locations and the actions of the players in the virtual scenes;
   (6) obtaining a rotation angle of the head of the player by a sensor-based registration method to determine the location and orientation of the view point of the user, rendering the scene in combination with the location and the action data obtained by the tracking module, displaying the scene in the virtual world to the user by using virtual reality glasses as an output device, and accomplishing the roaming and interaction of the player in the virtual scenes;
   (7) judging whether the game is over, and if so, terminating; and otherwise, skipping to the step (5).

10. The working method of the collaborative mode of claim 9, wherein in the step (1), the specific method of building the virtual maze comprises:
    (1-1) designing the planar maze graph in the real space by the drawing tool, and photographing the planar maze graph by a camera built in the mobile phone;
    (1-2) correcting the obtained pictures, manually marking four angular points on an outer frame of the maze in the photographed picture, and automatically performing, by the system, keystone correction of the picture according to a perspective distortion correction algorithm;
    (1-3) obtaining the feature information of the maze, and manually marking and storing the feature information of the maze in the corrected pictures.

11. The working method of the collaborative mode of claim 9, wherein in the step (5), the specific steps of tracking by the Kinect include:
    (5-1) correcting coordinates, selecting multiple groups of sample points with different locations in the real space such that the sample points are distributed uniformly, and measuring the location of each sample point in the virtual scenes and the location in the Kinect coordinate system;

(5-2) calculating a transformation matrix T of the Kinect for a virtual scene coordinate system by using the least square method; and (5-3) calculating the user location and recognizing action by capturing the location information of a hand joint point and the head of the user.

12. The working method of the collaborative mode of claim 11, wherein in the step (5-3), the specific method of calculating the user location is as follows: setting the obtained location information of the user by the $k^{th}$ frame of Kinect as $P_i(k)=\{x_i^k, y_i^k, z_i^k\}$, wherein i represents the number of persons capable of being tracked by the Kinect, $0<i<6$; and then using the location $VP_i(k)=P_i(k)*T$ of the player in the virtual reality to control the movement of a virtual hero.

13. The working method of the collaborative mode of claim 11, wherein in the step (5-3), the specific method of recognizing the action is as follows: judging the action of the user through the location information of the hand joint point and the head of the user captured by the Kinect: $(X_{LH}, Y_{LH}, Z_{LH})$, $(X_{RH}, Y_{RH}, Z_{RH})$ and $(X_H, Y_H, Z_H)$ respectively representing the spatial locations of a left hand, a right hand and the head of the user;

defining an action symbol: $\Delta Y_1 = Y_{LH} - Y_H$, $\Delta Y_2 = Y_{RH} - Y_H$, if $\Delta Y_1 > 0$ or $\Delta Y_2 > 0$, which indicates that the user lifts a hand, then controlling the interaction between the user and the object in the virtual scenes by the action symbol.

* * * * *

UNITED STATES PATENT AND TRADEMARK OFFICE
CERTIFICATE OF CORRECTION

PATENT NO. : 10,109,113 B2
APPLICATION NO. : 15/251252
DATED : October 23, 2018
INVENTOR(S) : Chenglei Yang et al.

Page 1 of 1

It is certified that error appears in the above-identified patent and that said Letters Patent is hereby corrected as shown below:

On the Title Page (72) Inventors should read:
Chenglei YANG, Shandong, China
Wei GAI, Shandong, China
Lu WANG, Shandong, China
Xiangxu MENG, Shandong, China
Mingda DONG, Shandong, China
Pu QIN, Shandong, China
Xiaowen SUN, Shandong, China
Juan LIU, Shandong, China
Nianmei ZHOU, Shandong, China Signed and Sealed this
Twenty-fifth Day of December, 2018

Andrei Iancu
*Director of the United States Patent and Trademark Office*